United States Patent [19]
Liebig

[11] Patent Number: 5,346,262
[45] Date of Patent: Sep. 13, 1994

[54] TUBE CONNECTION

[75] Inventor: Gerhard Liebig, Heidelberg, Fed. Rep. of Germany

[73] Assignee: Bundy International Limited, Abingdon, England

[21] Appl. No.: 145,725

[22] Filed: Nov. 3, 1993

Related U.S. Application Data

[63] Continuation of Ser. No. 852,532, Mar. 17, 1992, abandoned.

[30] Foreign Application Priority Data

Mar. 18, 1991 [DE] Fed. Rep. of Germany ........ 4108741

[51] Int. Cl.$^5$ ............................................. F16L 35/00
[52] U.S. Cl. ..................... 285/23; 285/334.5; 285/353; 285/382
[58] Field of Search ............... 285/334.5, 382, 382.1, 285/382.2, 23, 353

[56] References Cited

U.S. PATENT DOCUMENTS

| | | | |
|---|---|---|---|
| 2,323,912 | 7/1943 | Johnson | 285/334.5 |
| 2,687,906 | 8/1954 | Schnell. | |
| 2,741,498 | 4/1956 | Eiliott | 285/161 |
| 3,746,376 | 7/1973 | Gold | 285/334.5 X |
| 4,366,841 | 1/1983 | Currie et al. | |
| 4,522,435 | 6/1985 | Miller et al. | |
| 4,671,545 | 6/1987 | Miyazaki | 285/334.5 |
| 4,685,706 | 8/1987 | Kowal et al. | 285/382 X |
| 4,776,616 | 10/1988 | Umehara | 285/382 X |
| 4,842,310 | 6/1989 | Müffke et al. | 285/334.5 |

FOREIGN PATENT DOCUMENTS

| | | |
|---|---|---|
| 0275815 | 10/1987 | European Pat. Off. . |
| 0255221 | 2/1988 | European Pat. Off. . |
| 0428404 | 11/1990 | European Pat. Off. . |
| 128216 | 11/1976 | Fed. Rep. of Germany . |
| 3837359 | 3/1988 | Fed. Rep. of Germany . |
| WO85/0064 | 2/1985 | PCT Int'l Appl. . |

*Primary Examiner*—Dave W. Arola
*Attorney, Agent, or Firm*—Keck, Mahin & Cate

[57] ABSTRACT

A tube connection is provided for thin-walled, small calibre metal tubes 15,22, particularly for brake, fuel and hydraulic lines on motor vehicles and for use in refrigeration equipment, with at least one of the metal tubes 15,22 being provided with a flange 14,21 on the end to be connected and the metal tubes 15,22 being encompassed by a sleeve 1,2 in each case, one of which is deformable so as to form a fixed connection between the sleeves 1,2, the deformable sleeve 1 being constructed as an outer sleeve which encircles the other sleeve 2 constructed as an inner sleeve in the assembled condition at least over a portion of its length. The inner sleeve 2 is provided with a circular thicker portion 23 at the end nearest the flange 21 so that a part of the outer sleeve 1 is deformable behind this thicker portion 23 (FIG. 3).

11 Claims, 2 Drawing Sheets

TUBE CONNECTION

This application is a continuation of U.S. patent application Ser. No. 07/852,532, filed Mar. 17, 1992, now abandoned.

This invention relates to a tube connection for thin-walled, small calibre metal tubes, particularly for brake, fuel and hydraulic lines on motor vehicles and for use in refrigeration equipment, with at least one of the metal tubes being provided with a flange on the end to be connected and the metal tubes being encompassed by a sleeve in each case, one of which is deformable so as to form a connection between the sleeves.

Tube connections of this type are already known from German Patent 37 01 555 and from corresponding U.S. Pat. No. 4842310. These known tube connections are constructed such that a sleeve is provided with an inner circumferential fixing ring channel, a partially thin-walled pressure bush is slid on to the first metal tube until it abuts on the flange thereof, contact pressure of the flange against the sealing seat in the axial direction being produced by inserting the pressure bush into the sleeve, and by applying axial contact pressure between the pressure bush and the sleeve which causes the thin wall of the pressure bush to be deformed radially into the fixing ring channel of the sleeve. These known tube connections can be assembled without screwed joints. Only an axial compressive force is used and this can be effected with correspondingly shaped tongs. The known tube connections can, therefore, even be assembled in positions of difficult access. However, on these known tube connections the ring channel is arranged on the inside of the sleeve, which makes the sleeve relatively expensive to produce.

An object of the present invention is to provide as cost-effective a tube connection as possible which can be assembled without screw connections.

This objective is achieved according to the invention with the tube connection described in the introduction, in that the deformable sleeve is constructed as an outer sleeve which encircles the other sleeve constructed as an inner sleeve in the assembled condition at least over a portion of its length and in that the inner sleeve is provided with a circular thicker portion at the end nearest the flange, a part of the outer sleeve being deformable behind this thicker portion.

The tube connection according to the invention has the advantage in relation to the known tube connections, that the inner sleeve can be produced in a cost-effective manner, for example without machining by means of internal turning.

A particularly favourable manner of deforming the outer sleeve is provided in accordance with a further embodiment of the invention whereby the outer sleeve has a transition from a smaller to a larger outside diameter and whereby the transition in the case of the non-deformed outer sleeve is located in the area of the edge of the thicker portion of the inner sleeve which is remote from the flange. With this further development the radial deformation of the outer sleeve can be effected by an axial pressure with a tool which is adapted to the outer contour of the outer sleeve.

In order to produce an adequate compressive force in the radial direction, provision is made in accordance with an advantageous embodiment of this further development, for the transition to be effected at an angle of less than 45° and for preference 20°.

Various free-flowing materials, as for example free-flowing steel or high-grade steel or suitable non-ferrous heavy metal alloys can be suitably used as the material for the outer sleeve. The inner sleeve can be made of an appropriate material which is suitable for automatic machines.

A particularly favourable deformation of the appropriate portion of the outer sleeve during assembly can be achieved with another further development in that the outside diameter of the inner sleeve behind the thicker portion is reduced relatively rapidly and is gradually increased again. In this connection the reduction of the diameter occurs preferably at an angle in the region of 45° and the increase at an angle in the region of 10°.

Even in the case of tube connections which are produced by a permanent deformation, it may be advantageous to separate and reconnect these in a non-destructive manner for example for repair purposes. This makes possible another further development of the invention, in that the outer sleeve may consist of two parts, such that one of the parts is deformable and partially encircles the inner sleeve and the other part encompasses the metal tube, and in that a releasable connection is provided between the parts. The releasable connection is preferably a screw connection.

The sleeve consisting of two parts can be supplied already screwed for initial assembly so that all that is required for the initial assembly is a pressing together of the sleeves. Subsequently the connection of the two parts of the outer sleeve can be released and screwed together again as often as required. In spite of the preceding deformation of the outer sleeve, when reconnecting, an adequate screw path can be provided for producing a sufficiently high contact pressure between the flanges of the tubes. According to another further development a ring is provided between the parts which limits the screw-in depth. This ring can be made of plastic and removed before the separated tube connection is joined together again.

The invention is not limited to a connection between two tubes provided with flanges, but can also be used for connecting a tube to a unit, for example to a carburettor or injection pump in such a way that one of the sleeves is constructed as a connection pipe of the unit.

Some exemplary embodiments of the invention will now be described, reference being made to the accompanying drawings, in which.

In the embodiments of the invention to be described, the same parts are given the same reference numbers in all the figures.

Figure 1:
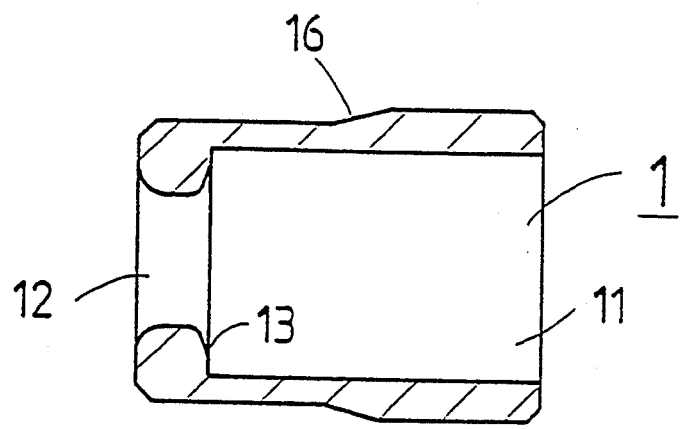
FIG. 1 shows a longitudinal cross-section through the outer sleeve of a first embodiment of the invention.
Figure 2:
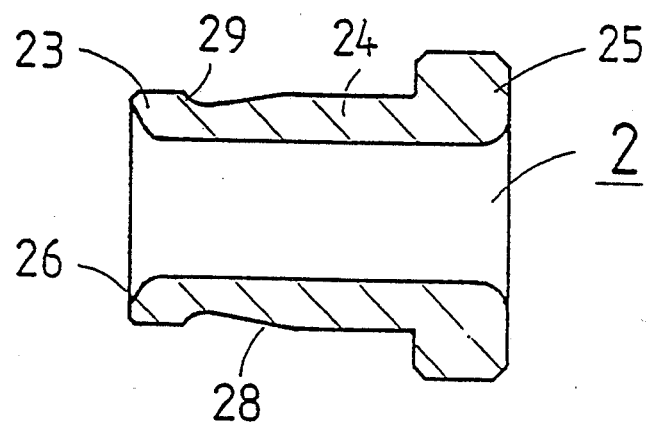
FIG. 2 shows a longitudinal cross-section through the inner sleeve of the first embodiment of the invention.
Figure 3:
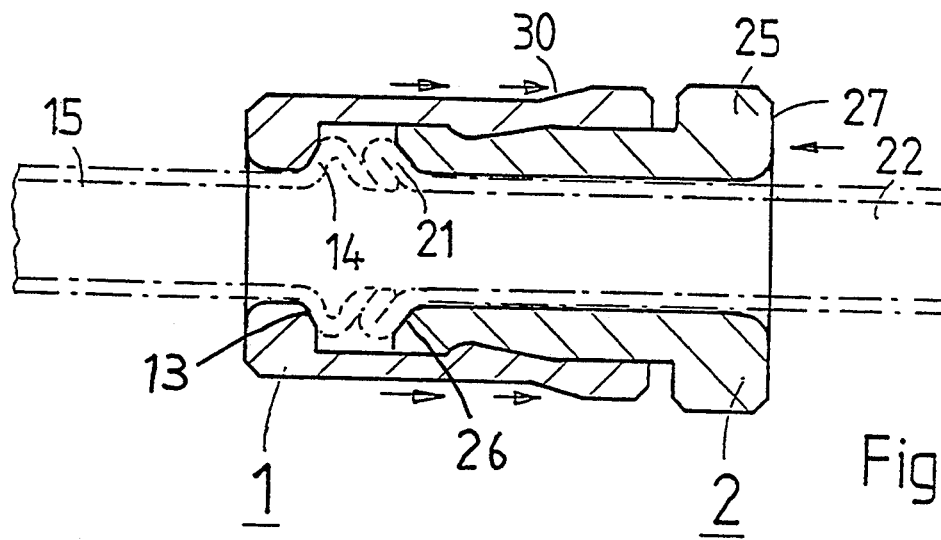
FIG. 3 shows a longitudinal cross-section of the first embodiment of the invention in the assembled condition.

The first embodiment shown in FIGS. 1 to 3 consists of an outer sleeve 1 and an inner sleeve 2. The internal bore 11 of the outer sleeve 1 has been narrowed at 12 so that a circular pressure edge 13 is provided for the flange 14 of a first tube 15. At 16 the outside diameter of the outer sleeve 1 changes from a lower to a greater value. The transition area 16 runs at an angle of 10° in relation longitudinal direction of the outer sleeve 1.

The inner sleeve 2 has a thicker portion 23 at the end nearest the flange 21 of the tube 22 and is encircled by the inner sleeve 2. The outside diameter of the thicker portion 23 and at 24 has been chosen in such a way that the inner sleeve 2 can be slid without difficulty into the outer sleeve 1. The outside diameter of the inner sleeve 2 is reduced relatively rapidly behind the thicker portion 23 after which it increases again at an angle of approximately 10°. At the other end of the inner sleeve 2 a flange 25 is located, which provides a pressure surface 27 for a tool, which is provided for the assembly of the tube connection.

For assembly the sleeves 1 and 2 located on the tubes 15 and 22 respectively are slid into each other until the flanges 14 and 21 and the corresponding pressure surfaces 13 and 26 of the sleeves abut on each other. A pressure tool, which is not shown in the figures, is applied on the one hand to the surface 27 of the flange 25 and on the other hand in the transition area 16 of the outer sleeve 1 and transmits the forces shown as arrows in FIG. 3 to the sleeves 1 and 2. For this purpose one part of the tool is constructed as a divisible sleeve, which encompasses the outer sleeve 1 at its smaller diameter and which is provided with an expansion corresponding to the transition area 16.

The inclination of the transition area 16 has been chosen in such a way that when a longitudinal force is applied to the outer sleeve 1 by the compressive force of the tool, it only results in an elastic expansion of the outer sleeve 1 in the area of the flanges 14 and 21 and thus in a prestressing of the sealing contact between the flanges 14 and 21. The essential part of the force exercised by the tool on the transition area 16 is directed however in the radial direction so that the outer sleeve 1, commencing with the transition areas 16, is deformed radially inwards behind the thicker portion 23 and after assembly has been completed extends into the recess formed between the thicker portion 23 and the area 24 of the inner sleeve 2. The outside diameter of the inner sleeve 2 which gradually increases at 28, in this arrangement provides support in such a way that an elongation of the outer sleeve 1 within the deformed part does not take place simultaneously during the deformation and that the material of the outer sleeve 1 pressed against the rear side 29 of the thicker portion 23 also remains directly there. The pressure movement of the tool ends at 30 and the assembly is completed.

Figure 4:
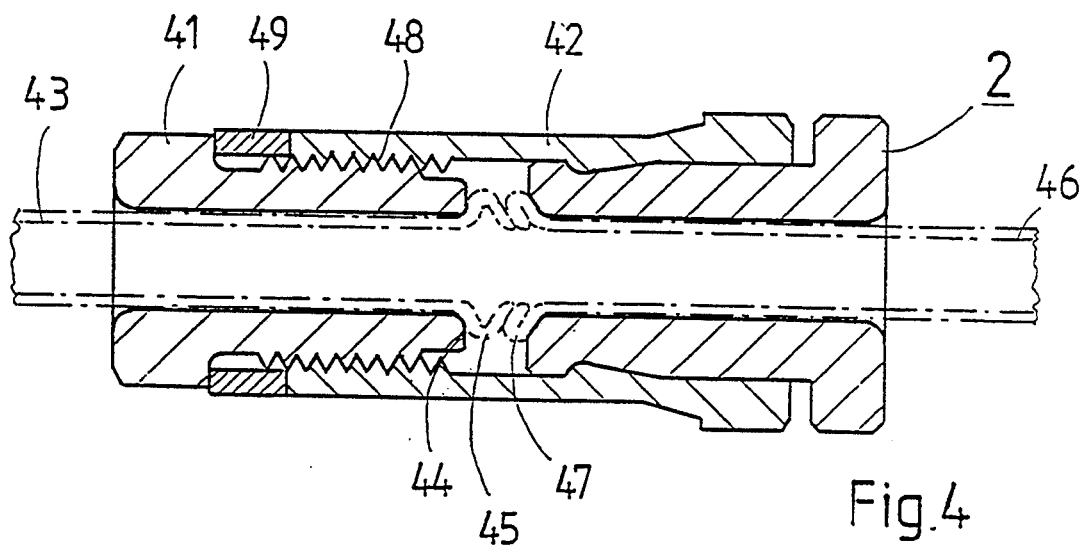
FIG. 4 shows a longitudinal cross-section in the assembled condition of a second embodiment of the invention.

In the embodiment shown in FIG. 4, the outer sleeve 1 consists of two parts 41 and 42. In this arrangement the part 41 encompasses one of the tubes 43 to be connected and forms a pressure edge 44 for the flange 45 of the tube 43. The other part 42 of the outer sleeve 1 is used for forming the fixed connection with the inner sleeve 2, which encircles the other tube 46 and presses its flange 47 on to flange 45. The connection between the part 42 of the outer sleeve 1 and the inner sleeve 2 is effected in a manner described in connection with FIGS. 1 to 3.

The parts 41 and 42 of the outer sleeve 1 are connected to each other via a thread 48. A ring 49 limits the screw-in depth of the part 41 into the part 42. The ring has a suitable elasticity and preferably made of plastic.

The parts 41 and 42 are arranged to be preassembled using the ring 49 for initial assembly. The production of the connection is effected by the deformation of the part 42 as already described. Should the connection require to be separated again, the part 41 is rotated relative to the inner sleeve 2 and the part 42 until the screw connection is released. The tube connection can be re-established, for example after one of the tubes 43 and 46 has been replaced. For this purpose the ring 49 is removed from the part 41, so that the part 41 can be screwed into the part 42 to the extent required for ensuring an adequate prestressing in a subsequent connection.

Figure 5:
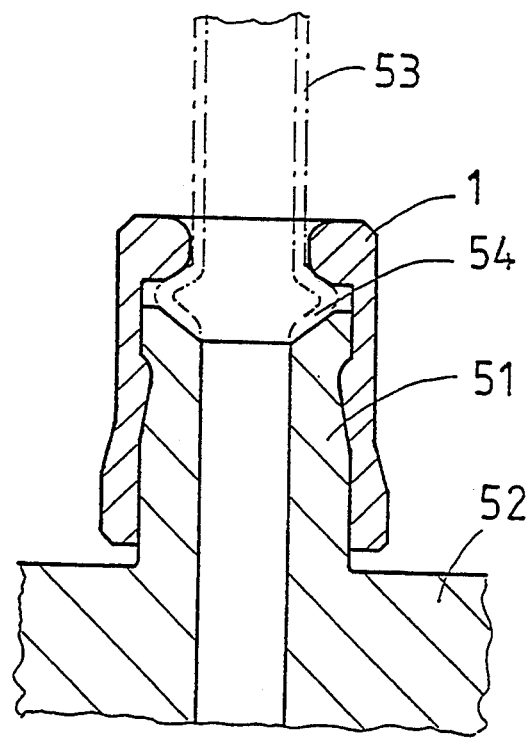
FIG. 5 shows a longitudinal cross-section in the assembled condition of a third embodiment of the invention.

In the embodiment shown in FIG. 5, the inner sleeve 2 forms at the same time a connection pipe 51 of a unit 52, which may for example be a carburettor, a fuel pump or another assembly to be connected with a tube 53. The open end of the connection pipe 51 is adapted to the flange 54 of the tube 53. The outer sleeve 1 in the embodiment according to FIG. 5 corresponds to that of the embodiment according to FIG. 1.

We claim:

1. A tube connection for thin-walled, small calibre metal tubes comprising:

a first metal tube furnished with a flange at a first end;
a second metal tube furnished with a flange at a first end disposed facing the first end of the first tube;
a first sleeve surrounding the first metal tube and having a part which is smaller in diameter than said flange of said first metal tube and which engages the flange of the first metal tube;
a second sleeve surrounding the second metal tube and having and end portion which is smaller in diameter than said flange of said second metal tube which engages the flange of the second metal tube;
the second sleeve being disposed co-axially inside the first sleeve with the flanges of the first and second metal tubes being disposed between said part of the first sleeve which engages the flange of the first metal tube and said end portion of the second sleeve which engages the flange of the second metal tube; said first sleeve engaging said second sleeve in deformed interlocking engagement therewith;
the second sleeve having a substantially uniform inner diameter therethrough and circular thicker portion relative to an adjacent portion at an end nearest the flange of the second metal tube, and the first sleeve having a generally cylindrical outer surface a first portion of which has a first diameter and a second portion of which has an increased diameter, a connection between the first and second sleeves and between the first and second metal tubes being effected by causing at least a part of the increased diameter portion of the first sleeve to be reduced in diameter in response to axial pressure between a deforming member acting on said first sleeve and said second sleeve, whereby an inner part of the first sleeve is deformed into said deformed interlocking engagement behind the thicker portion of the second sleeve.

2. A tube connection according to claim 1 wherein a transition between the first and second portions of the first sleeve is effected at an angle of less than 45°.

3. A tube connection according to claim 2, wherein the angle is approximately 20°.

4. A tube connection according to claim 1, wherein the first sleeve consists of a free-flowing material.

5. A tube connection according to claim 1, wherein an outside diameter of the second sleeve is reduced at a first angle behind the thicker portion and increases again at a second angle which is less than said first angle.

6. A tube connection according to claim 5, wherein reduction of the diameter takes place at an angle in the region of 45° and increase takes place at an angle in the region of 10°.

7. A tube connection according to claim 1, wherein the second sleeve is provided with a flange at the end remote from the flange of said metal tube.

8. A tube connection according to claim 1, wherein the first sleeve comprises two parts, wherein one part includes said second portion which is deformable and partially encircles the second sleeve and the outer part includes said smaller diameter part and encompasses said first metal tube and means providing a releasable connection between said two parts.

9. A tube connection according to claim 8, wherein the means providing said releasable connection is a screw connection.

10. A tube connection according to claim 9, wherein a ring is provided between the parts which limits screw-in depth of the screw connection.

11. A tube connection for a thin-walled, small calibre metal tube comprising;

a first metal tube furnished with a flange at a first end;

a second tube having a substantially uniform inner diameter therethrough and a first end disposed facing the first and of the first tube;

a sleeve surrounding the first metal tube and having a part which is smaller in diameter than said flange of said first metal tube which engages the flange of the first metal tube;

the second tube being disposed co-axially inside the sleeve with the flange of the first metal tube being disposed between said part of the sleeve which engages the flange of the first metal tube and said first end of the second tube; said sleeve engaging said second tube in deformed interlocking engagement therewith, the second tube having a circular thicker portion relative to an adjacent portion at an end nearest the flange of the first metal tube, and the sleeve having a generally cylindrical outer surface a first portion of which has a first diameter and a second portion of which has an increased diameter, a connection between the sleeve and the second tube and between the first and second tubes being effected by causing at least a part of the increased diameter portion of the sleeve to be reduced in diameter in response to axial pressure between a deforming member acting on said sleeve and said second tube, whereby an inner part of the sleeve is deformed into said deformed interlocking engagement behind the thicker portion of the second tube.

* * * * *